United States Patent [19]
Knutson

[11] Patent Number: 5,599,002
[45] Date of Patent: Feb. 4, 1997

[54] SNOWMOBILE ANTI-THEFT DEVICE

[76] Inventor: Kenneth J. Knutson, P.O. Box 365, Dawson, Minn. 56232

[21] Appl. No.: 378,727

[22] Filed: Jan. 26, 1995

[51] Int. Cl.⁶ .................................................. F16M 13/00
[52] U.S. Cl. .................... 248/552; 248/295.11; 248/503; 248/508; 180/190; 70/235
[58] Field of Search .................................. 248/552, 551, 248/295.11, 503, 507, 508, 352; 180/190; 70/225, 226, 235, 237, 238

[56] References Cited

U.S. PATENT DOCUMENTS

| | | | |
|---|---|---|---|
| D. 336,711 | 6/1993 | Miller | D34/28 |
| 2,931,525 | 4/1960 | Davis | 414/686 |
| 3,785,541 | 1/1974 | Sibley | 224/408 |
| 5,067,746 | 11/1991 | Baker | 248/552 X |
| 5,197,311 | 3/1993 | Clark | 248/552 X |
| 5,265,449 | 11/1993 | Rashleigh | 70/18 |
| 5,381,680 | 1/1995 | Rauch, Jr. | 70/226 |
| 5,421,611 | 6/1995 | Peterson et al. | 180/190 X |

FOREIGN PATENT DOCUMENTS

| | | | |
|---|---|---|---|
| 1003009 | 1/1977 | Canada | 180/190 |
| 1141802 | 2/1983 | Canada | 180/190 |
| 2060646 | 8/1993 | Canada | |
| 972035 | 1/1951 | France | 70/235 |
| 1067186 | 6/1954 | France | 70/235 |

*Primary Examiner*—Ramon O. Ramirez
*Assistant Examiner*—Brian J. Hamilla
*Attorney, Agent, or Firm*—Jacobson, Price, Holman & Stern, PLLC

[57] ABSTRACT

An anti-theft device made of welded steel material attached to the tail section of a snowmobile includes a U-shaped frame attached to the tail section of the snowmobile and includes a hollow sleeve extending vertically from the U-shaped frame. Spaced vertically above the U-shaped frame, attached to the hollow member, is a latch, an attachment bracket and an attachment plate. The pivotally mounted latch is biased to extend over one end of the hollow member for holding the lift bar in the hollow member. The attachment bracket is used to attach the device to a rear bumper of the snowmobile and the horizontally extending attachment plate is secured to the tail section of the snowmobile. A vertically extending lift bar is slidably mounted in the hollow member. The lift bar includes a groove defined in one side which is alignable with opposed openings in the hollow member. To lock the tail section of the snowmobile in an elevated position, the tail section of the snowmobile is lifted and the lift bar is slid into the hollow member until the latch engages an end surface of the lift bar and the groove in the lift bar is aligned with the holes in the hollow member. A bar of a lock is slid through the holes of the hollow member into engagement with the groove of the lift bar so as to lock the lift bar in position with the tail section of the snowmobile elevated.

9 Claims, 2 Drawing Sheets

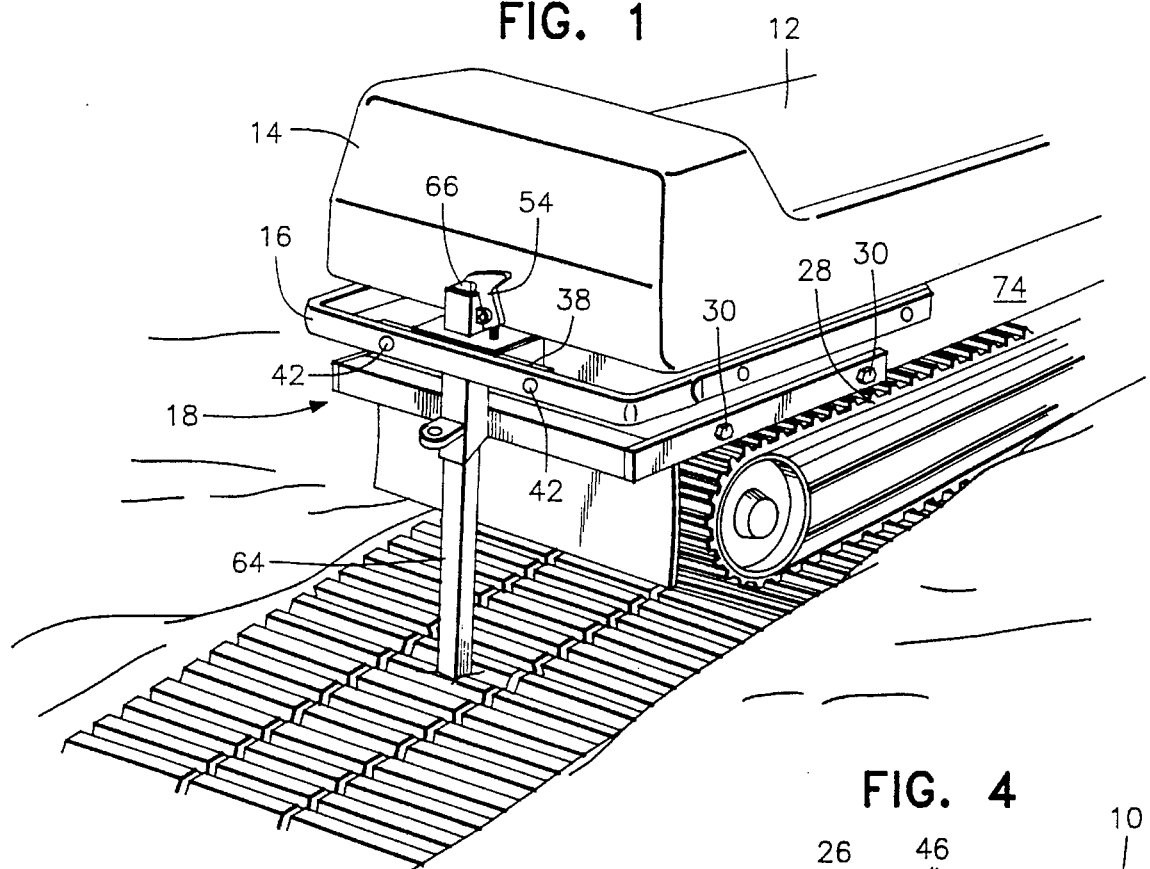
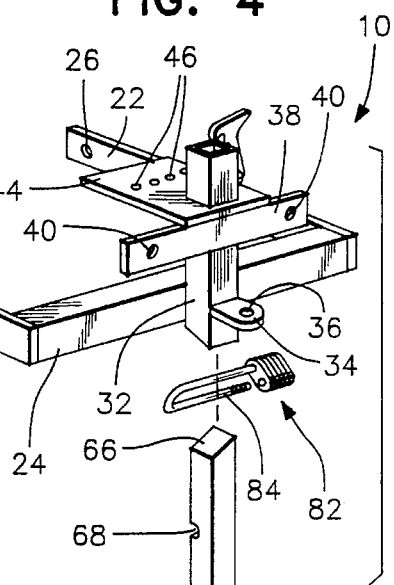
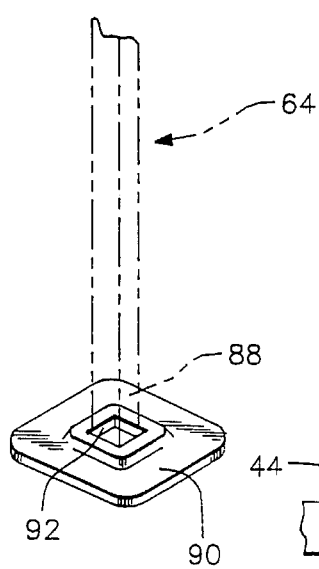
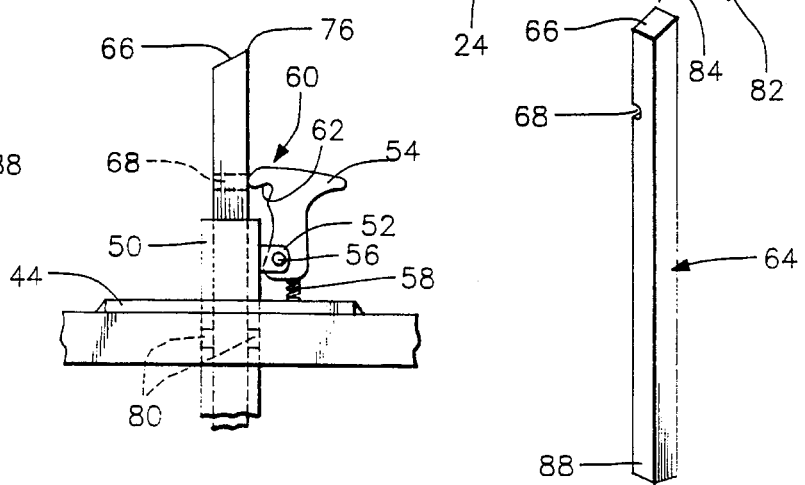

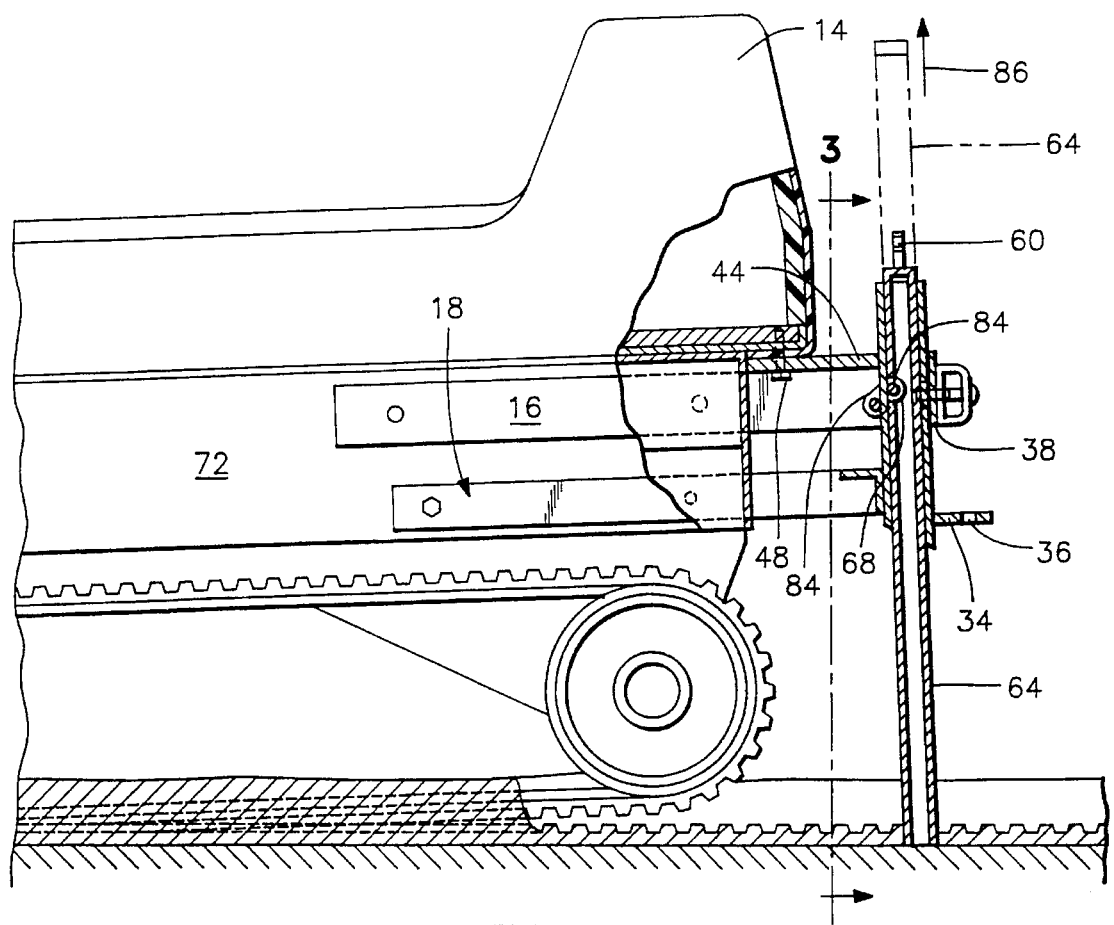
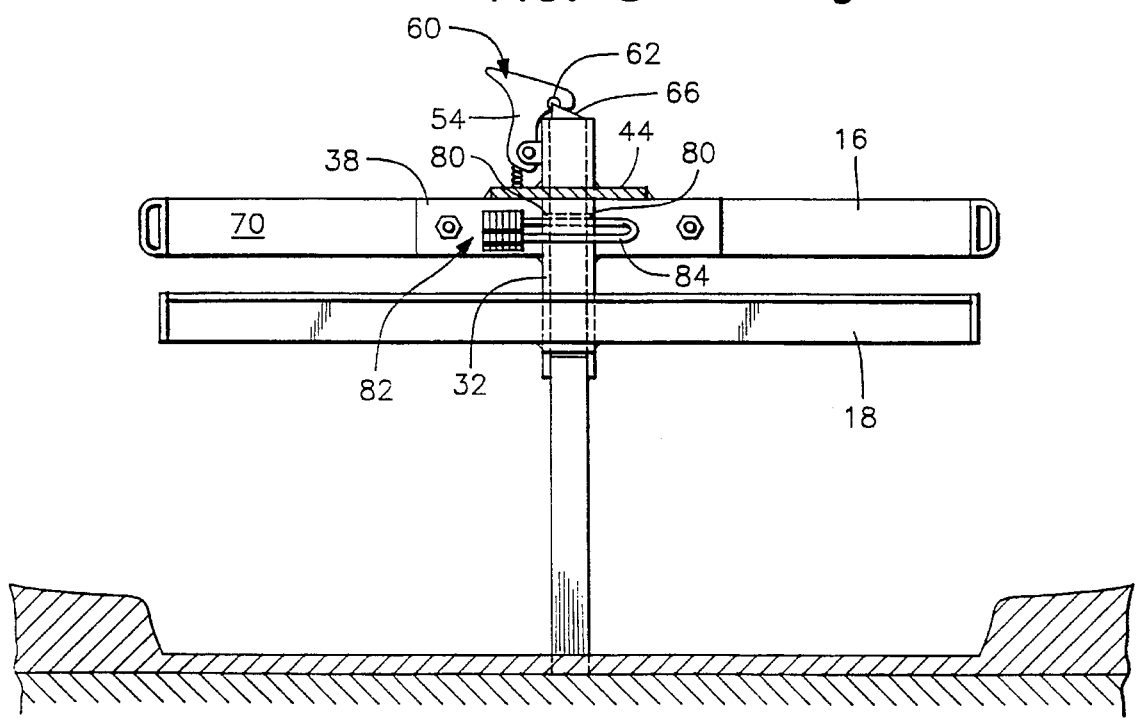

SNOWMOBILE ANTI-THEFT DEVICE

FIELD OF THE INVENTION

This invention relates to a device which is attachable to the tail section of a snowmobile to lock the snowmobile in an elevated position of rest to prevent theft of the snowmobile.

BACKGROUND OF THE INVENTION

It has been discovered that different manufacturers of snowmobiles sometimes use similar locking devices in the ignition switch such that the key of one snowmobile may readily fit into and operate the ignition switch of another snowmobile of a different manufacturer. To overcome this problem, several snowmobile anti-theft devices have been proposed.

For example, in U.S. Pat. No. 5,265,449 to Rashleigh, a snowmobile track lock is disclosed. An anti-theft device is used which has an elongated main arm member and an auxiliary arm member welded to the main arm member, with the arm members being made of case hardened steel and plastic coated. The two arm members are substantially parallel with a bight therebetween that is adapted to receive the track of the snowmobile.

The device fits across the track of a snowmobile between adjacent tread members and is locked in place on the track by a conventional lock that fits through cooperating apertures in the arm members. The ends of the arm members include blocks that are adapted to physically engage a portion of the body of the snowmobile so as to substantially preclude relative movement of the track with respect to the body of the snowmobile, thereby to preclude the snowmobile from being driven.

In addition, in Canadian Patent Application No. 2,060,646, a snowmobile jack is disclosed for lifting a snowmobile off the ground. The jack includes a lever with a handle and a base that can slide on the snow or ice to support the lever. This device allows for the lifting of a snowmobile to avoid the user from having to bend over to lift the snowmobile. Also, the device facilitates the turning around of the snowmobile.

Additionally, to elevate one end of a snowmobile, U.S. Pat. No. 3,785,541 to Sibley and U.S. Design Patent No. 336,711 to Miller disclose snowmobile support stands.

SUMMARY OF THE INVENTION

The present invention relates to an anti-theft device for a snowmobile which may also be used as a stand or prop for the tail section of the snowmobile. The device is made of welded steel material which is attached to the tail section of a snowmobile. The device includes a U-shaped frame attached to the tail section of the snowmobile and includes a hollow sleeve extending vertically from the U-shaped frame. Spaced vertically above the U-shaped frame, attached to the hollow member, is an attachment bracket and an attachment plate. The attachment bracket is used to attach the device to a rear bumper of the snowmobile and the horizontally extending attachment plate is secured to the tail section of the snowmobile.

A vertically extending lift bar is slidably mounted in the hollow member. The lift bar includes a groove defined in one side which is alignable with opposed openings in sidewalls of the hollow member.

To lock the tail section of the snowmobile in an elevated position, the tail section of the snowmobile is lifted and the lift bar is slid into the hollow member until the groove in the hollow member is aligned with the holes in the hollow member. A bar of a lock is slid through the holes of the hollow member into engagement with the groove of the lift bar so as to lock the lift bar in position with the tail section of the snowmobile elevated.

The lock is positioned on a side of the hollow member adjacent to the snowmobile such that the lock is made to be inaccessible by bolt cutters. The position of the lock easily allows insertion of a key or the hands of the snowmobile owner to enter a combination on the lock such as to open the lock and remove the lift bar up through the hollow member after disengagement of a latch trip mechanism which engages the top of the lift member in the locked position. The latch trip mechanism also aids in aligning the holes of the hollow member with the groove of the lift bar for correct positioning of the lift bar. It is possible to include a removable base member under a lower end of the lift bar to add additional support to the lift bar and prevent the lift bar from penetrating into the snow. In addition, the base member also serves as an aid in supporting the lift bar even when not in the locked position, so as to elevate the snowmobile to prevent sticking of the track of the snowmobile to the snow when the snowmobile is in a stationary position for an extended period of time.

Accordingly, it is an object of the present invention to provide a snowmobile anti-theft device including a U-shaped frame mounted on a tail section of the snowmobile with a lift bar slidably mounted in a hollow member mounted on the frame with a groove in one side of the lift bar aligned with holes in the hollow member for sliding of a locking bolt therethrough.

It is another object of the present invention to provide a snowmobile anti-theft device including a U-shaped frame mounted on a tail section of the snowmobile with a lift bar slidably mounted in a hollow member mounted on the frame with a groove in one side of the lift bar aligned with holes in the hollow member for sliding of a locking bolt therethrough with the lift bar serving as a device for elevating the tail section of the snowmobile.

It is still another object of the present invention to provide a snowmobile anti-theft device including a U-shaped frame mounted on a tail section of the snowmobile with a lift bar slidably mounted in a hollow member mounted on the frame with a groove in one side of the lift bar aligned with holes in the hollow member for sliding of a locking bolt therethrough with the lift bar serving as a device for elevating the tail section of the snowmobile and having a base member supporting the lower end of the lift bar to prevent compression of the snow by the lift bar.

It still yet another object of the present invention to provide a snowmobile anti-theft device including a U-shaped frame mounted on a tail section of the snowmobile with a lift bar slidably mounted in a hollow member mounted on the frame with a groove in one side of the lift bar aligned with holes in the hollow member for sliding of a locking bolt therethrough with the lift bar serving as a device for elevating the tail section of the snowmobile and having a base member supporting the lower end of the lift bar to prevent compression of the snow by the lift bar with a latch trip mechanism located on an upper end of the hollow member to hold the lift bar in a position for aligning the groove of the lift bar with the holes of the hollow member of insertion for a locking bolt therethrough.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 1 is a perspective view of the tail section of the snowmobile including the snowmobile anti-theft device according to a preferred embodiment of the present invention.

FIG. 2 is a side elevational, partial sectional view of the tail section of the snowmobile and the snowmobile anti-theft device according to the present invention as shown in FIG. 1.

FIG. 3 is a sectional view taken along line 3—3 of FIG. 2.

FIG. 4 is an exploded view of the components of the snowmobile anti-theft device prior to being mounted on a snowmobile.

FIG. 5 illustrates the latch trip mechanism located at the upper end of the hollow member of the snowmobile anti-theft device with the latch trip mechanism being retracted to allow passage of the lift bar.

FIG. 6 illustrates an optional base member to be located under the bottom end of the lift bar.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1 through 4, in particular, a snowmobile anti-theft device embodying the teachings of the subject invention is generally designated as 10. With reference to its orientation in FIG. 1, the anti-theft device 10 is secured to a snowmobile 12 at its tail section 14 located at the rear of the snowmobile. A preexisting rear bumper 16 extends from the tail section 14.

With reference to FIG. 4, the snowmobile anti-theft device according to the present invention includes a U-shaped mounting bracket 18 having legs 20, 22 and interconnecting cross bar 24. Each leg 20, 22 includes two bolt holes 26 for securing the U-shaped bracket 18 in the tunnel of the snowmobile formed between the bumper 16 and the rotating track 28. As shown in FIG. 1, bolts 30 extend through bolt holes 26 to secure the U-shaped bracket 18 to the snowmobile 12.

Extending perpendicular to cross bar 24 is hollow member 32 with tow hitch 34 and tow hitch hole 36. Spaced vertically above the cross bar 24 and secured to hollow member 32 is rectangular mounting bracket 38 having two bolt holes 40 through which pass bolts having bolt heads 42 to secure the mounting bracket 38 to the rear bumper 16. Mounting bracket 38 extends parallel to the cross bar 24.

Surrounding hollow member 32 and extending perpendicular to mounting bracket 38 is mounting plate 44. Mounting plate 44 includes four bolt holes 46 through which pass bolts 48 to secure the mounting plate 44 to the underside of the tail section 14 of the snowmobile 12.

Extending laterally from an upper end 50 of hollow member 32 are flanges 52 between which is latch trip mechanism 54. Latch trip mechanism is pivotally mounted on a bolt 56 passing through lateral flanges 52. Extending between mounting plate 44 and latch trip mechanism 54 is a spring 58 which biases upper end 60 of latch trip mechanism 54 towards a position extending over upper end 50 of hollow member 32. The upper end 60 includes a recess 62 which will be used in aligning the anti-theft device of the invention.

Dimensioned to be slidably mounted within the opening of hollow member 32 is lift bar 64. The exterior of lift bar 64 is shaped the size of the interior of hollow member 32 to slide within hollow member 32. Lift bar 64 includes a slanted uppermost surface 66 and a lateral groove 68 formed in one side of the lift bar 64.

To install the anti-theft device of the present invention, the mounting bracket 38 is preferably secured on an interior surface 70 of rear bumper 16 and the legs 20, 22 of U-shaped mounting bracket 18 are then secured to the sides 72, 74 of the snowmobile. Once the anti-theft device is secured to the snowmobile, and it is desired to lock the snowmobile into position, the latch trip mechanism 54 is retracted to clear the opening at upper end 50 of the hollow member 32 so as to allow the lift bar 64 to slide into hollow member 32. The upper slanted surface 66 is positioned so that the highest pointed end 76 of the slanted surface is located extending towards latch trip mechanism 54.

As the tail section of the snowmobile is elevated, the lift bar 64 descends through hollow member 32, until upper slanted surface 66 clears the upper end 60 of the latch trip mechanism 54. The latch trip mechanism 54 is biased to extend over the upper slanted surface 66 by the force of spring 58. Then lowering of the tail section 14, the pointed end 76 of upper slanted surface 66 engages in recess 62 of the latch trip mechanism 54 as shown in FIG. 3. Latch trip mechanism 54 prevents further downward movement of the tail section 14.

In this position, with the pointed end 76 of the lift bar 64 engaged by the recess 62 of the latch trip mechanism 54, the groove 68 in the side of the lift bar 64 is aligned with holes 80 in the sides of the hollow member 32 at a location behind the mounting bracket 38. A locking device such as a U-shaped, keyed lock 82 having U-shaped bar 84, has one portion of the U-shaped, bar pass through the two openings 80 in the side walls of the hollow member 32 and also simultaneously pass through the groove 68 of the lift bar 64. The lock 82 is thereby positioned behind the mounting bracket 38 to prevent access to the lock 82 by bolt cutters. However, the lock 82 is easily accessed for key release or entry of a combination in the case of the use of a combination lock. The snowmobile is thereby locked in an elevated condition.

To release the anti-theft device, the lock 82 is first removed. Then, the tail section 14 is slightly elevated to release the engagement of the pointed end 76 of upper slanted surface 66 with the recess 62 of the latch trip mechanism 54. The latch trip mechanism 54 is then retracted to a position out of the way of the lift bar 64 to allow sliding of the lift bar 64 in an upward direction as indicated by arrow 86, to withdraw the lift bar 64 from the hollow member 32. The lift bar 64 may then be stored for travel and locking of the snowmobile at a different location.

As an option for use with a lower end 88 of the lift bar is a base member 90 having a recessed area 92 for receipt of the lower end 88 of the lift bar 64. Base member 90 can be used when the lift bar 64 is used as a stand without the use of a lock 82 or when the lift bar is locked in the hollow member by the lock 82. The base member is preferably not fixed to the lift bar 64 to allow the sliding of the lift bar 64 through the hollow member 32.

By the present invention a deterrent to the theft of snowmobiles is provided by providing limited access to a lock which secures the position of a snowmobile in an elevated position. Even if an ignition key of the snowmobile is available, it would not be possible to drive the snowmobile using the anti-theft device of the present invention since the tail section is in an elevated position. Alternatively, the anti-theft device of the present invention may be used as a stand for elevating the tail section of the snowmobile to prevent freezing of the snowmobile track in the snow.

Having described the invention, many modifications thereto will become apparent to those skilled in the art to which it pertains without deviation from the spirit of the invention as defined by the scope of the appended claims.

I claim:

1. An anti-theft device for locking a snowmobile in an elevated position, said anti-theft device comprising:

a bracket for mounting to a tail section of the snowmobile, a hollow member mounted on said bracket, two holes in opposed sidewalls of said hollow member, a lift bar slidably mounted in said hollow member, said lift bar including an opening, and a latch pivotally mounted on said hollow member and biased to extend over one end of said hollow member for holding said lift bar in said hollow member with said opening of said lift bar being aligned with said holes in said hollow member for receiving a locking bar through said opening of said lift bar and said two holes of said hollow member while the tail section of the snowmobile is elevated, said latch engaging an end surface of said lift bar when said lift bar is in said hollow member and said lift bar is used for elevating the tail section of the snowmobile.

2. An anti-theft device as claimed in claim 1, wherein said bracket is U-shaped for attachment to opposite sides of the snowmobile.

3. An anti-theft device as claimed in claim 1, wherein said end surface is slanted.

4. An anti-theft system comprising:

a snowmobile having a tail section, a bracket mounted on said tail section, a hollow member mounted on said bracket, two holes in opposed sidewalls of said hollow member, a lift bar slidably mounted in said hollow member, said lift bar including an opening, and a latch mounted on said hollow member for holding said lift bar in said hollow member with said opening of said lift bar being aligned with said holes in said hollow member for receiving a locking bar through said opening of said lift bar and said two holes of said hollow member while the tail section of the snowmobile is elevated, said latch engaging an end surface of said lift bar when said lift bar is in said hollow member and said lift bar is used for elevating said tail section of said snowmobile.

5. An anti-theft system as claimed in claim 4, wherein said bracket is U-shaped and attaches to opposite sides of said snowmobile.

6. An anti-theft system as claimed in claim 4, wherein said latch is pivotally mounted on said hollow member.

7. An anti-theft system as claimed in claim 6, wherein said latch is biased to extend over one end of said hollow member.

8. An anti-theft system as claimed in claim 4, wherein said lift bar includes a base member.

9. An anti-theft system as claimed in claim 4, wherein said latch includes a recess for engaging said lift bar.

\* \* \* \* \*